March 14, 1944.  D. FIRTH  2,344,240
COOLED SHAFT BEARING
Filed June 20, 1941  2 Sheets-Sheet 1
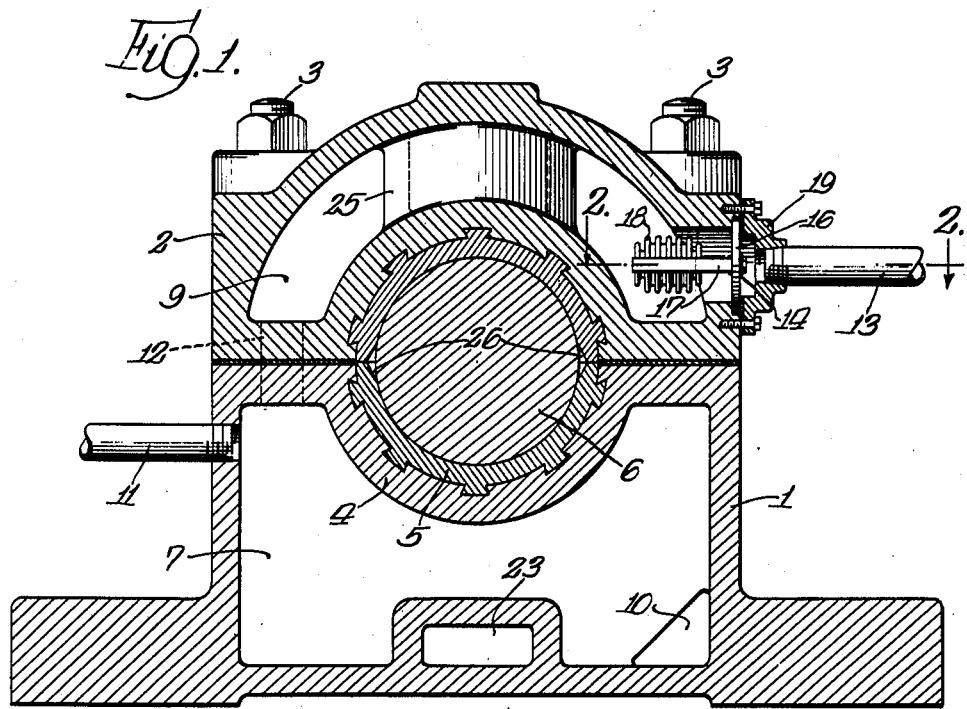
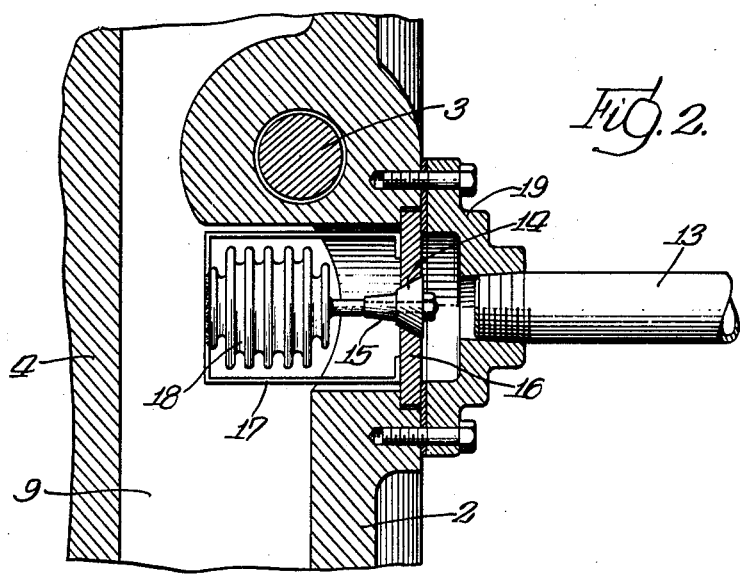
INVENTOR.
David Firth,
BY Osgood H. Dowell
Atty.

March 14, 1944.　　　D. FIRTH　　　2,344,240
COOLED SHAFT BEARING
Filed June 20, 1941　　　2 Sheets-Sheet 2
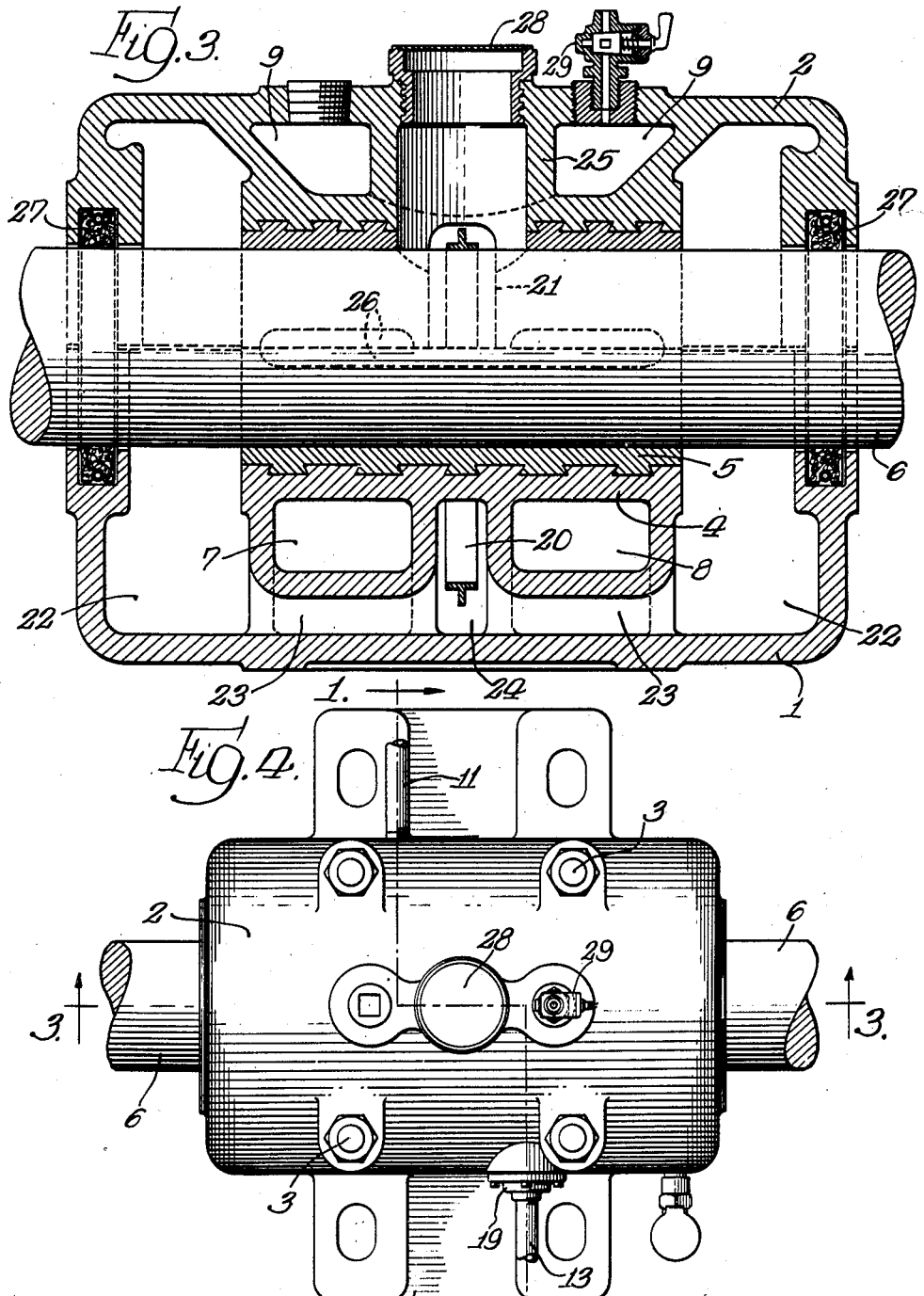
INVENTOR.
David Firth,
BY Osgood H. Dowell
Atty.

Patented Mar. 14, 1944

2,344,240

UNITED STATES PATENT OFFICE 2,344,240

COOLED SHAFT BEARING

David Firth, South Bend, Ind., assignor to Dodge Manufacturing Corporation, Mishawaka, Ind., a corporation of Indiana Application June 20, 1941, Serial No. 398,889

7 Claims. (Cl. 308—77)

An object of this invention is to provide a shaft bearing with means for automatically cooling it after the bearing has first been heated to a temperature suitable for efficient operation and for cooling it in a manner to avoid overcooling as well as to protect the bearing from overheating. For this purpose, and to obtain further advantages, the bearing is constructed or provided with a coolant jacket adapted to be connected for circulation or flow of water or other coolant therethrough and a thermostatic control is provided whereby to initiate cooling when the bearing attains or slightly exceeds a predetermined temperature desirable or suitable for efficient operation and to regulate the cooling in accordance with the heating of the bearing to maintain it substantially at or near such temperature until cessation of conditions to heat it above such temperature. The invention includes a practicable organization of a liquid cooled bearing with thermostatically operated means for initiating and regulating the cooling under control of the temperature of the bearing. A further feature of the invention is the provision of a plain type bearing having a thermostatically controlled cooling system and a lubricating system in an organization wherein cooling medium in the cooling system is initially utilized as a heating medium for raising the temperature of the lubricating oil as is desirable to prevent scuffing.

Protection of bearings from overheating is important. The molecular structure of bearing metals is changed greatly by heating. The Babbitt metal or other liners of plain type bearings may become so softened by heating as to allow scoring or wiping of the bearings by the shaft, thus damaging the bearings and often causing consequent injury to the shaft. So also in the case of antifriction bearings, the hardened steel bearing elements may be injuriously affected by excessive temperatures, promoting early deterioration and breakdown of the bearings. While however it is important in bearings for certain uses to provide for protection from overheating, it is also importantly desirable that the bearings should be rapidly brought to and maintained at sufficiently high temperatures for efficient operation.

Overheating of bearings may be caused from excessive loads or high operating speeds or from conduction of heat to the bearings through a shaft driving a mechanism in contact with hot materials or gases. In machinery for use under conditions where the bearings would generate heat rapidly, as well as in machinery for operating in the presence of intense heat or having a shaft for driving a mechanism in contact with hot materials or gases, it is common practice to provide for protection from overheating by coolant jackets through which water or other liquid circulates. However, bearings cooled by circulation of cooling liquid therearound may be and are often in operation for prolonged times at temperatures too low for efficient operation or below ideal or desirable temperatures, due to the removal of generated heat by the circulating coolant at such a rate as to prevent or unduly retard the heating of the bearings to suitable or desirable temperatures for efficient operation. Normally when an operator starts up a machine having water cooled bearings he immediately turns on the water, lest in the press of other duties he should forget or unduly delay to turn it on later and thus allow the bearings to become hot and probably or possibly injured. If the bearings are too cool for efficient operation when the machine is started, the dissipation of generated heat from the bearings by the flowing of cooling water therearound may keep them long below a proper temperature for efficient operation. Moreover, since the cooling water flows through the coolant jackets at a certain rate, use of the bearings under conditions where they generate heat at slower rates than those contemplated may result in undue cooling of the bearings. Machines with water cooled bearings may therefore run often and for long time periods with the bearings below ideal or satisfactory temperatures. On the other hand, when a machine is shut down and the cooling water turned off, heat may continue to be conducted to the bearings through the shaft in cases where the shaft has been operated in the presence of intense heat or driving a mechanism heated by hot materials or gases. Injuries to bearings and consequent injuries to shafts may thus result from overheating after shut down of machinery.

The present invention obviates difficulties and objections incident to the use of liquid cooled bearings such as above indicated, and gives further advantages. By controlling circulation or flow of cooling medium through the coolant jacket of a bearing by appropriate valve means thermostatically controlled to operate automatically in accordance with the temperature conditions of the bearing, the coolant in the coolant jacket is maintained stagnant until the bearing becomes heated to a certain temperature desirable for efficient operation. The time required for the bearing to reach such temperature is therefore greatly reduced since the heat generated in the bearing through friction or conducted through the shaft to the bearing needs only to raise the temperature of the stagnant coolant in the jacket. After the desired temperature is reached the thermostatically controlled valve will open gradually until a rate of flow is established to maintain the bearing at the desired temperature, and in event of fluctuations in the heating of the bearing the valve will govern the flow accordingly to maintain the bearing at such desired temperature. The initial heating of the stagnant coolant in the coolant jacket, before initiation of cooling by flow of coolant through the jacket, results in a transfer of heat from the heated coolant to lubricant oil in contact with walls of the coolant jacket for raising the temperature of the oil as is desirable to prevent scuffing and scoring. And after the shutting down of the machinery, if conditions are such that heat will continue to be transmitted to the bearing through the shaft, the circulation of the coolant through the jacket will continue either continuously or intermittently as required to prevent the overheating of the bearing until it is finally reduced to a safe temperature. A shaft bearing embodying the invention is therefore as efficient as an uncooled bearing in the sense that in service it will attain a temperature suitable for efficient operation substantially or nearly as quickly as if it were unprovided with cooling equipment, and much more efficient in the sense that it will be automatically cooled after attaining such temperature, in a manner to maintain it at a substantially uniform such temperature until cessation of conditions to heat the bearing above such temperature, thus avoiding premature cooling and overcooling as well as protecting the bearing from overheating both during operation and after shut down of machinery.

One practicable shaft bearing structure containing an embodiment of the invention is shown for illustration in the accompanying drawings, wherein:

Fig. 1 is a cross section of the illustrative structure taken on the line 1—1 of Fig. 4, the left half of the section being through the inlet of the coolant jacket of the bearing and the right half of the section being through the outlet from such coolant jacket.

Fig. 2 is an enlarged horizontal section of a fragmentary portion of the structure taken through the coolant outlet and showing the thermostatically operated valve whereby circulation or flow through the coolant jacket is controlled.

Fig. 3 is a longitudinal section of the structure taken in the vertical plane of the shaft axis.

Fig. 4 is a top elevation or plan view of the structure on a reduced scale.

The illustrative structure comprises a water-jacketed plain type bearing embodied in a pillow block split horizontally in the plane of the shaft axis, the base member 1 and cap member 2 of the pillow block being separably connected by the bolts 3. The water-jacketed portion of the structure which may be referred to as the bearing proper comprises a cylindrical holder 4 lined by a liner 5 of Babbitt metal or other suitable bearing metal in which the shaft 6 is journalled. The complemental upper and lower half parts of this bearing are formed in the respective members of the pillow block which are hollowed to provide a surrounding coolant jacket comprising in this instance a plurality of communicating water chambers 7, 8 and 9 connected in series. The water chambers 7 and 8 in the base member communicate through a passage 10 (Fig. 1). One of these chambers 7 is connected with the cold water inlet pipe 11. The other chamber 8 (Fig. 3) communicates through a passage 12 (indicated by dotted lines in Fig. 1) with the upper chamber 9 which covers substantially or nearly the entire upper half part of the bearing and is connected with an outlet pipe 13. The inlet pipe 11 may lead from a cooler into which water is returned by the outlet pipe 13, or the inlet pipe may lead from any suitable source for supplying water under pressure of a liquid head, as from a pipe connected with a city water main, while the outlet pipe 13 may discharge to waste. In other words the coolant jacket may be connected in any suitable manner for circulation of the water or other cooling medium through the coolant jacket, the circulation or flow in this instance being from the inlet through the chamber 7, passage 10 (Fig. 1), chamber 8 (Fig. 3), passage 12 (Fig. 1) and upper chamber 9 to the outlet.

Circulation or flow through the coolant jacket is controlled by a normally closed valve automatically operable by means controlled by the temperature of the bearing. It is desirable for the purposes of the invention to employ a small valve of the gradually progressively opening type, a preferred and advantageous form of which comprises a small reciprocatory conical valve 14 engaging a correspondingly formed valve seat around a flow orifice and having a tapered extension 15 which partially occupies the valve seat orifice when the valve is unseated. In the construction shown the valve seat is in a removable plate 16 having an attached frame 17 supporting a thermostat 18 comprising a hollow corrugated drum expansible to a material extent when heated to a certain temperature, said thermostat being arranged within the coolant jacket in line with the valve and having one end fixed by attachment to said frame and its free or movable end affixed to the valve stem. The plate 17 with attached frame, thermostat and valve constitute a simple, compact, efficient unit easily installed. In the construction shown the orifice controlled by the valve is utilized as the outlet from the coolant jacket, the plate 16 being secured in a countersunk part of the pillow block cap 2 by means of a fitting 19 for attaching the outlet pipe 13, said fitting providing a chamber in which the valve can work. By arranging the valve to control the outlet, rather than at another point, these advantages result. First, the thermostat can be located in the upper water chamber 9 remote from the inlet and therefore will not be objectionably influenced by the incoming cold water. Secondly, in a system wherein the inlet pipe is connected with a source of water under pressure and the outlet pipe connected to waste, the coolant jacket is maintained full of water at all times, whether there be circulation or not.

The valve being normally closed prevents circulation during and until the bearing attains or slightly exceeds a certain temperature, whereupon the thermostat will operate the valve to initiate and regulate circulation in accordance with the heating of the bearing to maintain it substantially at or near such temperature so long as conditions prevail for heating the bearing to a higher temperature, or in other words so long as the bearing runs at its customary speed and thereafter until cessation of transmission of heat to the bearing through a shaft or cessation of other conditions which might lead to overheating when the bearing is still. The substantially uniform temperature at which the bearing will be maintained is determined by the design of the valve and thermostat in relation to the design and proportions of the bearing and its coolant jacket, and may therefore be a predetermined temperature ideal or desirable for efficient operation of the bearing. With the thermostatic valve shown, the control of flow to give the desired temperature when the valve is opened may be nicely adjusted by calibration of the tapered extension of the valve. The small thermostatically operated valve allows only a restricted regulated flow through the valve seat orifice, whereas the bearing is jacketed by large water chambers, so that although there may be substantial flow from the inlet to the outlet of the coolant jacket the current through the water chambers will be slow, giving effective utilization of the cooling water and conservation in the use thereof.

For lubricating the bearing, in the illustrative structure, oil is applied to the shaft by an oiler ring 20 hung on the shaft midway of the bearing, said oiler ring enclosing the lower half of the bearing holder 4 and the upper half thereof being suitably internally formed and cut out as at 21 to accommodate the oiler ring. A sump for the lubricating oil is provided by chambers 22 in the extended end portions of the pillow block communicating by oil passages 23 extending through the bottoms of the water chambers 7 and 8 with the medial oil space 24 in which the oiler ring dips. Oil is introduced into the sump around the oiler ring through the tubular neck 25 integral and continuous with the upper half of the bearing holder 4 and surrounded by the upper water chamber 9. It will be observed that the several oil chambers and spaces in the neck 25 through which the oil is poured are partitioned from the water chambers by metal walls of moderate thickness, so that during initial heating of the stagnant water in the water jacket transference of heat takes place from the water to the oil for raising its temperature as is desired to prevent scuffing and scoring. Oil distributing grooves in the bearing liner 5 are indicated in dotted lines at 26. The shaft openings in the ends of the pillow block are sealed around the shaft by suitable sealing rings 27. A removable cap for closing the neck through which oil is introduced is indicated at 28. To allow filling the coolant jacket with water in the first instance, air can be vented from the top of the coolant jacket through a small vent valve 29 which can be closed after the coolant jacket is filled.

It will be observed that in a liquid cooled bearing embodying the invention the automatic thermostatic control determines the period of preliminary heating of the bearing and regulates the ensuing cooling; insures conditioning of the bearing for efficient operation by heating it to a certain temperature, with accompanying raising of the temperature of the lubricating oil, in the minimum time allowed by the physical character of the structure and the conditions of its use; automatically initiates, regulates and terminates the cooling; prevents overcooling as well as overheating, prevents waste of coolant, and continues the protection of the bearing from overheating while heat continues to flow thereto through the shaft after the machine is shut down.

Obviously the invention is not limited to the particular embodiment thereof shown and described.

I claim as my invention:

1. A shaft bearing having a coolant jacket adapted to be connected for flow of a cooling medium through said jacket, a normally closed automatically operated valve for controlling flow through the jacket, thermally expansible means in said jacket for controlling the operation of said valve, and a removable plate forming a part of the wall of said jacket and having the orifice controlled by said valve, said plate having an inwardly projecting support for said thermally expansible means the latter being attached at one end to said support, and, the plate, valve and thermally expansible means being insertible as a unit.

2. A shaft bearing comprising a metallic support having a shaft bearing portion, an oiler ring hung on the shaft midway of the bearing, said support having at opposite sides of said ring chambers for holding liquid in contact with said shaft bearing portion and a lubricant reservoir partially surrounded by said liquid chambers from which the oiler ring transfers oil to the shaft for lubricating the bearing, there being passages whereby liquid may flow from a source of cool liquid to and through and from said chambers, and automatically operable valve means thermostatically controlled in accordance with the temperature of the bearing for preventing such flow until the bearing becomes heated to or slightly above a certain temperature suitable for efficient operation and then allowing and regulating such flow to maintain the bearing at or near such temperature during continuance of conditions for heating it above such temperature.

3. A shaft bearing comprising separately connected base and cap members forming complemental half parts of a plain type bearing, said base member being formed with coolant chambers jacketing the lower half part of the bearing and with an intermediate oil space and oil passages communicating with said space and partially enclosed by said chambers, an oiler ring hung on the shaft between said chambers and dipping in said space, there being passages whereby liquid may flow from a source of cool liquid to and through and from said chambers, and automatically operable valve means for preventing such flow until heating of the bearing to or slightly above a certain temperature suitable for efficient operation and then allowing and regulating the flow to maintain the bearing at or near such temperature during continuance of conditions for heating it above such temperature.

4. A shaft bearing having a coolant jacket adapted to be connected for flow of cooling liquid therethrough, and means controlled by temperature of liquid in said jacket for initiating and regulating such flow, said means comprising a thermostat in said jacket and a normally closed valve preventing flow of cooling liquid through said jacket until the bearing becomes heated to or slightly above a certain temperature suitable for efficient operation and operable by said thermostat for then allowing and regulating such flow to maintain the bearing at or near such temperature until cessation of conditions for heating it above such temperature, said jacket remaining full of the liquid in stagnant condition while the valve is closed and said thermostat actuating said valve to open at a certain temperature of the stagnant liquid in said jacket.

5. A shaft bearing having a coolant jacket adapted to be connected for flow of cooling liquid therethrough, a thermostat in said jacket, and a normally closed automatically operable valve controlled by said thermostat for preventing flow of cooling liquid through said jacket until the bearing becomes heated to or slightly above a certain temperature suitable for efficient operation and then allowing and regulating such flow to maintain the bearing at or near such temperature until cessation of conditions for heating it above such temperature, said jacket remaining full of the liquid in stagnant condition while the valve is closed and said thermostat actuating said valve to open at a certain temperature of the stagnant liquid in said jacket, said valve being of the gradually progressively opening type so that after opening it may gradually assume a partially closed position to restrict the flow as required for maintaining the aforesaid temperature of the bearing.

6. A shaft bearing having a coolant jacket adapted to be connected for flow of cooling liquid therethrough, a thermostat in said jacket, and a normally closed automatically operable valve controlled by said thermostat for preventing flow of cooling liquid through said jacket until the bearing becomes heated to or slightly above a certain temperature suitable for efficient operation and then allowing and regulating such flow to maintain the bearing at or near such temperature until cessation of conditions for heating it above such temperature, said jacket remaining full of the liquid in stagnant condition while the valve is closed and said thermostat actuating said valve to open at a certain temperature of the stagnant liquid in said jacket, said valve comprising a reciprocatory conical valve head having a tapered stem which partially occupies the valve seat orifice when the valve is fully open.

7. A shaft bearing having a coolant jacket adapted to be connected for flow of cooling liquid therethrough, automatically operable valve means thermostatically controlled in accordance with the temperature of the bearing for preventing such flow until the bearing becomes heated to or slightly above a certain temperature suitable for efficient operation and then allowing and regulating such flow until cessation of conditions for heating it above such temperature, said jacket remaining full of the liquid in stagnant condition while the valve is closed, a reservoir for holding a supply of oil away from the bearing proper and in contact with extensive portions of the walls of said jacket, whereby before opening of the valve the stagnant liquid in said jacket is utilized as a heating medium for heating the oil, and means for feeding the oil from said reservoir to the bearing.

DAVID FIRTH.